(12) United States Patent
Asakawa

(10) Patent No.: US 6,606,464 B2
(45) Date of Patent: Aug. 12, 2003

(54) METHOD AND APPARATUS FOR IMAGE READING AND IMAGE FORMING, WITH SHADING OPERATION CONTROL FOR INCREASED THROUGHPUT

(75) Inventor: Tetsuo Asakawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 09/749,542

(22) Filed: Dec. 28, 2000

(65) Prior Publication Data

US 2001/0014227 A1 Aug. 16, 2001

(30) Foreign Application Priority Data

Dec. 28, 1999 (JP) .......................... 11-374270

(51) Int. Cl.[7] .......................................... G03G 15/043
(52) U.S. Cl. ........................................ 399/51; 399/205
(58) Field of Search .................................. 399/51, 205

(56) References Cited

U.S. PATENT DOCUMENTS 4,702,987 A * 10/1987 Fukuchi et al. ............. 430/122
5,157,483 A * 10/1992 Shoji et al. ................. 358/75
5,978,614 A * 11/1999 Takeuchi .................... 399/32

FOREIGN PATENT DOCUMENTS

| JP | 425859 A | * | 1/1992 |
| JP | 5-68144 | * | 3/1993 |
| JP | 7-264400 | | 10/1995 |
| JP | 8-009116 | | 1/1996 |
| JP | 9-247395 | | 9/1997 |
| JP | 10-108014 | | 4/1998 |

* cited by examiner

Primary Examiner—Quana M. Grainger
(74) Attorney, Agent, or Firm—Oblon, Spivak, McClelland, Maier & Neustadt, P.C.

(57) ABSTRACT

A method and apparatus for image reading and image forming. A shading operation is performed by initially setting an operation parameter necessary for the shading operation and an image reading operation. The shading operation is then performed, an image reading operation is executed, and a further shading operation is then performed after the image reading operation. An operation parameter is then again set when a preparation of a next image reading operation is completed, an image reading operation is performed, and then a further shading operation is performed.

30 Claims, 14 Drawing Sheets

METHOD AND APPARATUS FOR IMAGE READING AND IMAGE FORMING, WITH SHADING OPERATION CONTROL FOR INCREASED THROUGHPUT

CROSS-REFERENCE TO RELATED APPLICATIONS

This document claims priority and contains subject matter related to Japanese Patent Application No. 11-374270, filed on Dec. 28, 1999, and the entire contents of which are hereby incorporated herein by reference.

BACKGROUND OF THE INVENTION

1. Field of the Invention

The present invention relates to an image reading device having a sheet-through mechanism for use in a scanner and an image forming apparatus, such as a copying machine, a facsimile, etc., and more particularly to an image reading device that increases reading throughput and that obtains quality image data by performing an image reading operation which satisfies user needs.

2. Discussion of the Background

In a background art image reading device which reads an image of an original document via a sheet-through mechanism, a white plate reading operation (i.e., a shading operation) has to be performed before reading the image of the original document. Consequently, loss of time, caused by a movement of a scanner carriage to the white plate, results. It has been considered to reduce the number of shading operations in order to increase reading throughput. However, it is preferable that the shading operation is performed each time an image of an original document is read because a shading waveform changes with a lighting period of time of an exposure lamp. For example, Japanese Patent Laid-Open Publications Nos. 8-9116 and 9-247395 describe technologies addressing the above-described problem.

According to Japanese Patent Laid-Open Patent Publication No. 8-9116, two white plates are provided. An image of an original document read by a first or a second image reading mode is converted to electric signals from optical signals using a photoelectric element. In the first image reading mode, the image of the original document placed on a platen is read. In the second image reading mode, the image of the original document fed by an original document feeding unit is read. A shading correction for the image read by the first image reading mode is performed using a shading waveform generated by reading a first white plate. A shading correction for the image read by the second image reading mode is performed using a shading waveform generated by reading a second white plate.

According to Japanese Patent Laid-Open Publication No. 9-247395, a reading operation of a white plate is performed before reading an image of an original document with respect to a second original document thereafter. The reading operation of the white plate is carried out at a predetermined time either after a trailing edge of a preceding original document has passed between the white plate and a platen, or before a leading edge of a next original document abuts against the white plate.

As described above, two white plates are employed according to Japanese Patent Laid-Open Publication No. 8-9116, which increases the needed number of parts to be used, thereby resulting in an increase of man-hours needed to produce the device. The image reading device disclosed in Japanese Patent Laid-Open Publication No. 9-247395 cannot be used for a copying machine which can read an image of an original document either by a sheet-through mechanism or by putting the original document on a platen and covering it with a pressure plate, because an image reading position does not move in the image reading device.

With respect to synchronization between an image reading operation and an image output operation, for example, synchronization between an original document to be read and a transfer sheet is required in a copying machine. Image reading and writing operations are performed only after preparations of the original document and the transfer sheet have been completed. In a facsimile, synchronization between a preparation of an application for the facsimile and an image reading operation is required. It is necessary to effectively utilize a waiting time for synchronization so as to increase reading throughput, and an appropriate shading operation has to be performed in order to obtain a high quality image.

Furthermore, shading data for a next original document is obtained after an image of the preceding original document is read in the case of reading a plurality of original documents. However, when an operator switches, for example, an image quality mode before reading the image of the next original document, shading data for the next original document has to be acquired again.

SUMMARY OF THE INVENTION

The present invention has been made in view of the above-mentioned and other problems and addresses the above-discussed and other problems.

The present invention advantageously provides a novel image reading device and method in which an image of an original document is read either by a sheet-through mechanism or by placing the original document on a platen, with increased reading throughput.

The present invention also provides a novel image forming apparatus with increased reading throughput by performing a shading operation immediately after an image of an original document is read by a sheet-through mechanism.

The present invention further provides a novel image reading device and an image forming apparatus which perform a shading operation which sacrifices reading throughput when a switching of an image quality mode or a background removal mode is performed.

According to an embodiment of the present invention, an image reading device includes an exposure optical system configured to read an image of an original document conveyed on a platen at a fixed speed, a shading plate configured to be read for acquiring shading data used for correcting a white level of image information readout, a scanner carriage configured to move an image reading position of the exposure optical system for reading the shading plate, and a controller configured to control the scanner carriage such that the scanner carriage moves to a position where the shading plate is disposed so as to perform a shading operation before and after image reading operations of the original document are performed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
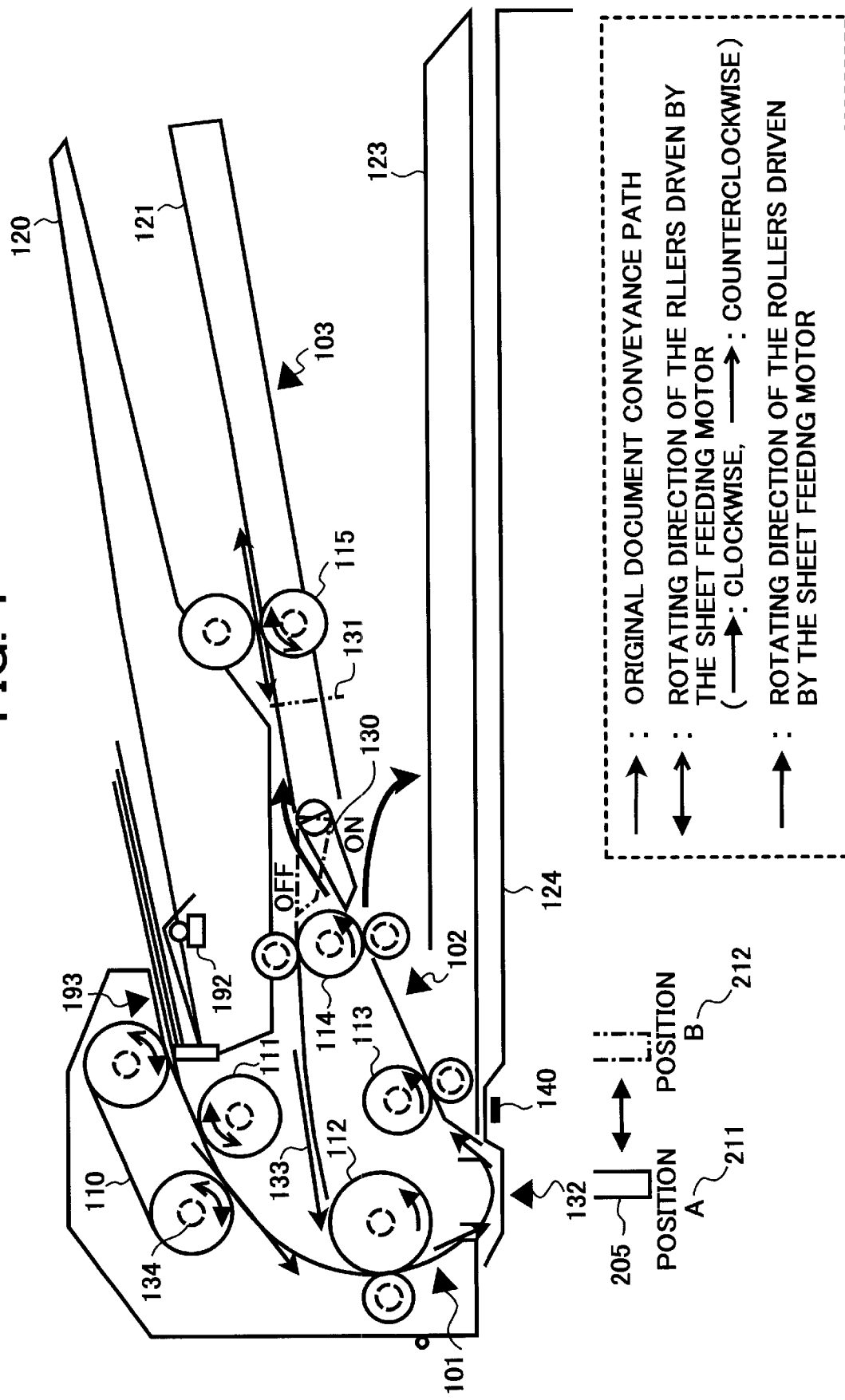
FIG. 1 is a schematic drawing illustrating a structure of an original document feeding unit for use in a digital copying machine according to an embodiment of the present invention.

Referring now to the drawings, wherein like reference numerals designate identical or corresponding parts throughout the several views, the embodiments of the present invention are now discussed.

1.1 A construction of an image forming apparatus (e.g., a digital copying machine).

FIG. 1 is a schematic drawing illustrating a structure of an original document feeding unit for use in a digital copying machine according to an embodiment of the present invention. An image forming apparatus generally denotes a whole apparatus (or system), such as a printer, a facsimile, a copying machine, etc., in which an input signal is processed as image data and a visible image is output based on the processed image data. However, an image forming apparatus in the embodiment of the present invention may denote only a printer engine which forms an image as one of functions performed by the system.

Figure 2:
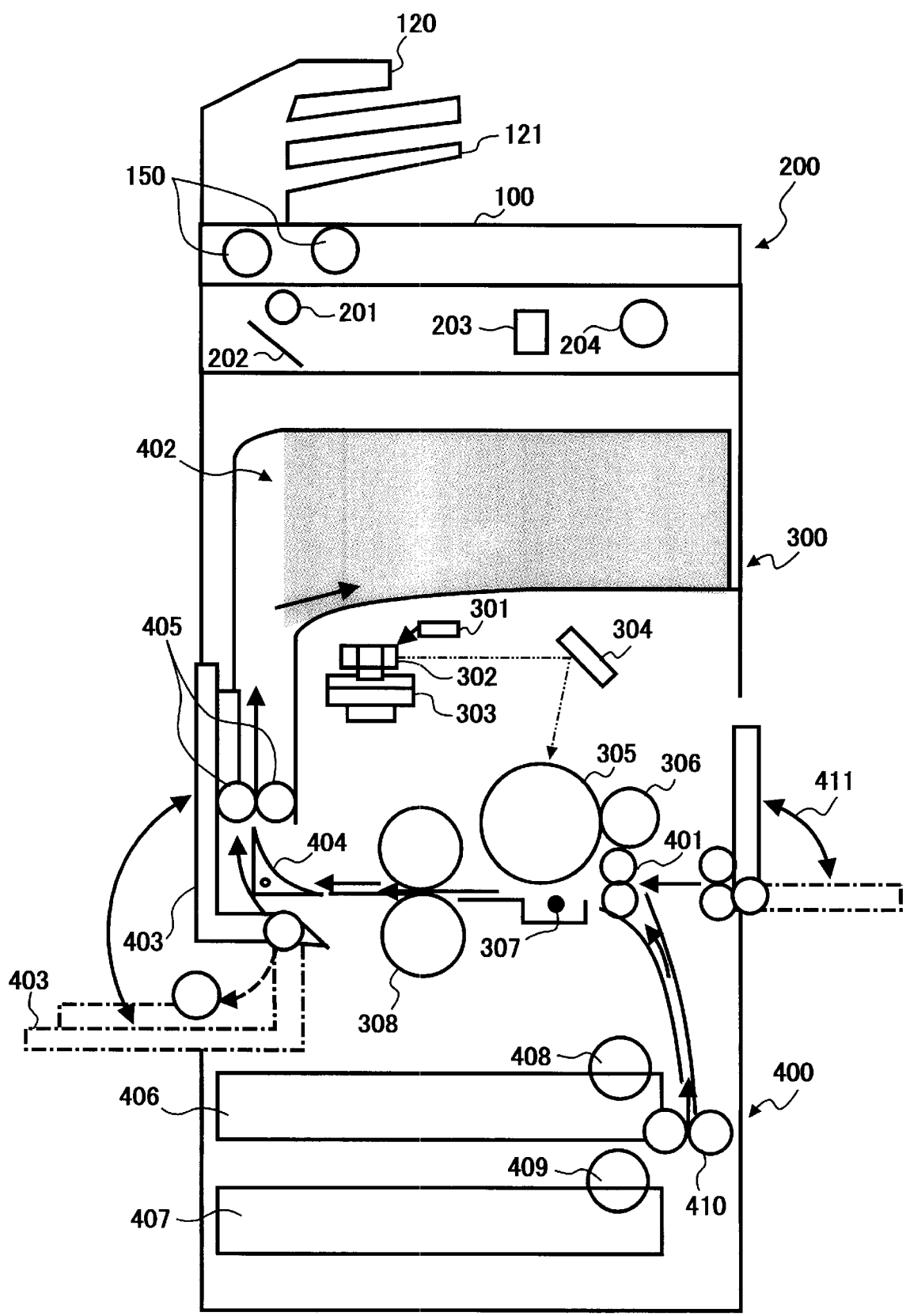
FIG. 2 is a schematic drawing illustrating a structure of a digital copying machine.

According to the present invention, a digital copying machine 1 illustrated in FIG. 2 includes an original document feeding unit 100, an image reading unit 200, an image forming unit (i.e., a printer engine) 300, and a sheet feeding unit 400 as main components.

The original document feeding unit 100 is now explained below in detail referring to FIG. 1.

In this exemplary embodiment, an original document supplying unit employs an automatic document feeding unit in which double-sided original document sheets are automatically fed (hereinafter referred to as an ARDF), an exposure optical system is fixed at a fixed exposure position formed into a slit shape, and an exposure of an original document is performed while the original document is conveyed at a fixed speed.

The ARDF 100 includes an original document feeding tray 120 and an original document exit tray 123 vertically arranged above a platen 124. The ARDF 100 also includes an original document reverse tray 121 between the original document feeding tray 120 and the original document exit tray 123 so as to form a path for reversing, i.e. flipping-over, an original document. The original document feeding tray 120 includes an original document set sensor 193 for detecting a setting of an original document, a baseplate solenoid 192 for moving an original document to an original document feeding position, and a sheet feeding clutch 134 for driving a sheet feeding belt. The original document set sensor 193 may be a transmission sensor which detects an original document by a feeler pushed up by the original document. A sheet path switching pick 130 switches a path through which an original document conveyed from an original document reading position 132 is fed. Namely, the path leading to the original document reverse tray 121 or the path leading to the original document exit tray 123 is selected. The sheet path switching pick 130 can be operated by a solenoid.

Three sensors are arranged to control a conveyance of an original document. The sensors include a registration sensor 101, a sheet discharging sensor 102, and a sheet reverse tray sensor 103. Each of the above-described sensors may be a reflective sensor having a filter. Each of following rollers is driven by one of two stepping motors 150 (FIG. 2). A sheet feeding belt 110, a separation roller 111, and a reverse roller 115 are driven by a reverse sheet feeding motor, which rotates both in the normal and the reverse directions. A pullout roller 112, a supplementary roller 113, and a sheet discharging roller 114 are driven by a sheet conveying motor, which rotates only in one direction. The reverse roller 115 includes a torque limiter for a case in which a sheet moves in the reverse direction of rotation of the roller.

In the original document feeding unit 100, each of the following operations (1)–(6) can be performed.

(1) A sheet feeding operation for reading an image on a frontside of an original document.

(2) A sheet feeding operation for reading an image on a backside of an original document.

(3) A reversing operation of an original document located at a registration position.

(4) A feeding operation of an original document to a registration position again after an image thereon has been read.

(5) A discharging operation of an original document after an image thereon has been read.

(6) A discharging operation of an original document from a registration position. Each operation is now explained below.

(1) A sheet feeding operation for reading an image on a frontside of an original document.

Original documents set in the original document feeding tray 120 are picked up by the sheet feeding belt 110 and the separation roller 111, and they are separated sheet-by-sheet so that one sheet at a time is then conveyed to an inside of the ARDF 100. The original document is conveyed by the pullout roller 112. The original document stops when the registration sensor 101 detects a leading edge of the original document. The reverse sheet feeding motor rotates in a clockwise direction in this operation.

(2) A sheet feeding operation for reading an image on a backside of an original document.

Original documents set in the original document feeding tray 120 are picked up by the sheet feeding belt 110 and the separation roller 111, and they are separated sheet-by-sheet so that one sheet at a time is then conveyed to the inside of the ARDF 100. Then, the sheet is conveyed by the pullout roller 112 and the sheet discharging roller 114. A sheet path switching solenoid is activated when the sheet discharging sensor 102 detects the leading edge of the original document. Then, the sheet path switching pick 130 is switched in a downward direction such that a sheet conveying path is opened toward the original document reverse tray 12 1. The original document stops when it is conveyed to a switchback point 131. The reverse sheet feeding motor rotates in a clockwise direction in this operation.

When the original document stops at the switch back point 131, the reverse sheet feeding motor rotates in a counterclockwise direction in order to rotate roller 115 in the reverse direction. Then, the sheet path switching solenoid is turned off, and the sheet path switching pick 130 is switched in an upward direction. As a result, the sheet conveying path is opened toward a sheet refeeding path 133 so that the original document is conveyed to the position where the registration sensor 101 is located. The reverse sheet feeding motor rotates in a counterclockwise in this operation.

(3) A reversing operation of an original document located at a registration position.

The original document, which has stopped at the position where the registration sensor 101 is located, is conveyed toward the original document reading position 132. When the sheet discharging sensor 102 detects the leading edge of the original document, the sheet path switching solenoid is turned on so as to switch the sheet path switching pick 130 in a downward direction. Thus, the sheet conveying path is opened toward the original document reverse tray 121. The original document is conveyed to the switchback point 131 after the sheet discharging sensor 102 detects the trailing edge of the original document, and it stops there. The reverse sheet feeding motor rotates in a clockwise direction in this operation.

The rotating direction of the reverse sheet feeding motor is changed into a counterclockwise direction so as to rotate in the reverse direction after the original document has stopped at the switchback point 131. The sheet path switching solenoid is turned off so that the sheet conveying path is switched to the sheet refeeding path 133, and the original document is again conveyed to the position where the registration sensor 101 is disposed. The reverse sheet feeding motor rotates in a counterclockwise direction in this operation.

(4) A feeding operation of an original document to a registration position again after an image thereon has been read.

The original document, which has stopped at the position where the registration sensor 101 is located, is conveyed to the original document reading position 132 where the original document is exposed. The sheet path switching solenoid is turned on to switch the sheet path switching pick 130 such that the sheet conveying path is opened toward the original document reverse tray 121, after the sheet discharging sensor 102 detects the leading edge of the original document. The original document is conveyed to the switchback point 131 after the sheet discharging sensor 102 has detected the trailing edge of the original document, and it stops there. The reverse sheet feeding motor rotates in a clockwise direction in this operation.

The rotating direction of the reverse sheet feeding motor is changed into a counterclockwise direction so as to rotate in the reverse direction, after the original document stopped at the switchback point 131. The sheet path switching solenoid is turned off so that the sheet conveying path is switched to the sheet refeeding path 133. Then, the original document is again conveyed to the position where the registration sensor 101 is located. The reverse sheet feeding motor rotates in a counterclockwise direction in this operation.

(5) A discharging operation of an original document after an image thereon has been read.

The original document, which has stopped at the position where the registration sensor 101 is disposed, is conveyed to the original document reading position 132 where the original document is exposed. The sheet path switching solenoid is turned off so that the sheet conveying path is switched toward the original document exit tray 123. Then, the original document is discharged to the original document exit tray 123. The reverse sheet feeding motor rotates in a counterclockwise direction in this operation.

(6) A discharging operation of an original document from a registration position.

The original document, which has stopped at the position where the registration sensor 101 is disposed, is conveyed to the original document reading position 132. The sheet path switching solenoid is turned off to switch the sheet path switching pick 130 such that the sheet conveying path is opened toward the original document exit tray 123. Then, the original document is conveyed to the original document exit tray 123. The reverse sheet feeding motor rotates in a clockwise direction in this operation.

As shown in FIG. 2, in the image reading unit 200, an original document is irradiated by an exposure lamp 201 which is a light source. Reflected light from the original document is led to a CCD (i.e., Charge-Coupled Device) 203 through a mirror 202. The reflected light is converted into an electric signal by the CCD 203, and then necessary image processing is performed.

1.2 A printer engine.

According to the embodiment of the present invention, the image forming unit 300 employs an electrophotographic printer engine. However, any apparatus may be used in which an image transmitted in the form of an electric signal is formed on a plain paper, a thermo-sensitive paper, etc., by means such as an electrophotographic printing, a thermal printing, a thermal transfer printing, an ink jet printing, and so forth. Although a structure of an electrophotographic printer engine is commonly known, an exemplary construction of it is now described below referring to FIG. 2.

An image signal, which is an image of an original document read by the image reading unit 200, and then converted into image data, is applied to a LD (i.e., laser diode) unit 301. The image signal is modulated, and is then emitted to a polygon mirror 302 as laser beam light. The laser beam light emitted to the polygon mirror 302, which is rotated by a polygon motor 303 at a high speed, is reflected by a writing mirror 304. Then, the reflected laser beam light is led to a photoconductive drum 305 so as to form a latent image by a commonly known electrophotographic technology. The formed latent image is developed into a toner image by a developing unit 306. A transfer sheet, which has stopped at a position where a registration roller 401 is arranged, is conveyed in precise registration with the toner image. The toner image formed on a surface of the photoconductive drum 305 is transferred onto the transfer sheet by a transfer unit 307. The transferred image is fixed onto the transfer sheet by being heated and pressed by a fixing unit 308. Then, the transfer sheet is discharged to an internal sheet discharging section 402 or to an external sheet discharging section formed by opening a sheet discharging cover 403. A sheet conveying path switching pick 404 is provided so as to switch a path where a transfer sheet is discharged, i.e., to the internal sheet discharging section 402 or to the external sheet discharging section. When a transfer sheet is discharged to the internal sheet discharging section 402, the transfer sheet is conveyed by a sheet conveying roller 405.

A transfer sheet is supplied either from a first sheet feeding cassette 406 or a second sheet feeding cassette 407 by being picked up by a sheet feeding roller 408 or a sheet feeding roller 409, respectively. The transfer sheet is then conveyed to the position where the registration roller 401 is located.

A sheet conveying roller 410 is provided to convey a transfer sheet when the transfer sheet is supplied from the second sheet feeding cassette 407. In addition to the first and second sheet feeding cassettes 406 and 407, a manual sheet supply door 411 is arranged to manually supply a transfer sheet. Accordingly, a transfer sheet can be manually supplied by opening the manual sheet supply door 411.

1.3 A definition of terms.

The following definitions of terms are provided to help in the understanding of the present invention. However, the definitions provided should not be considered limiting to the extent that the terms are known in the art.

<Expanded function>, <Application>

One of the most striking features of a digital copying machine constructed as described above is that an image is read by being converted into an electric signal, and the electronic signal is reconstructed by an image forming unit. The above-mentioned feature can be applied in a field other than a copying machine when devices, which variously change and transmit the read electric signal, are provided. Therefore, an application range may be very wide. For example, on top of a facsimile and a printer function, a scanner function, a file system function, and so forth can be added so as to perform these added functions. These "expanded functions" are expressed as an "application".

<Video signal>

An electric signal of an image converted by the image reading unit 200, the electric signal of the image input to the image forming unit 300, and signals synchronizing with the electric signal of the image are expressed herein as a "video signal".

<Control signal>, <Command>

In order to exchange the video signals among the image reading unit 200, the image forming unit 300, and the above-described applications, information must be conveyed among these relative devices. A means of conveying the information is expressed as an issue of a "control signal" or a "command".

<System>, <System controller>

Recent digital copying machines include not only one of the above-mentioned applications but also include a plurality of applications. A digital copying machine in which one resource is shared by a plurality of applications is expressed as a "system" digital copying machine. A controller which controls this system is expressed as a "system controller".

<Resource>

A unit of function shared by a plurality of applications is expressed as a "resource". The above-mentioned system controller controls a system in the resource unit. A digital copying machine according to the embodiment of the present invention controls resources, such as an "image reading unit", an "image forming unit", an "operation unit", a "memory", and "accessories including a document feeder, a sorter, etc".

<Shading>, <Shading data>, <Shading correction>

One line of an output in a main scanning direction when reading a true white document is retained so as to define a white level. Generally, it is referred to as a shading waveform or shading data, which varies depending on an environmental temperature of a lamp, a period of time that the lamp stays on, and an accumulated period of use of the lamp. A readout image signal is corrected using the shading data, and an appropriate image signal is obtained by a shading correction.

1.4 A sheet-through shading operation.

Figure 3:
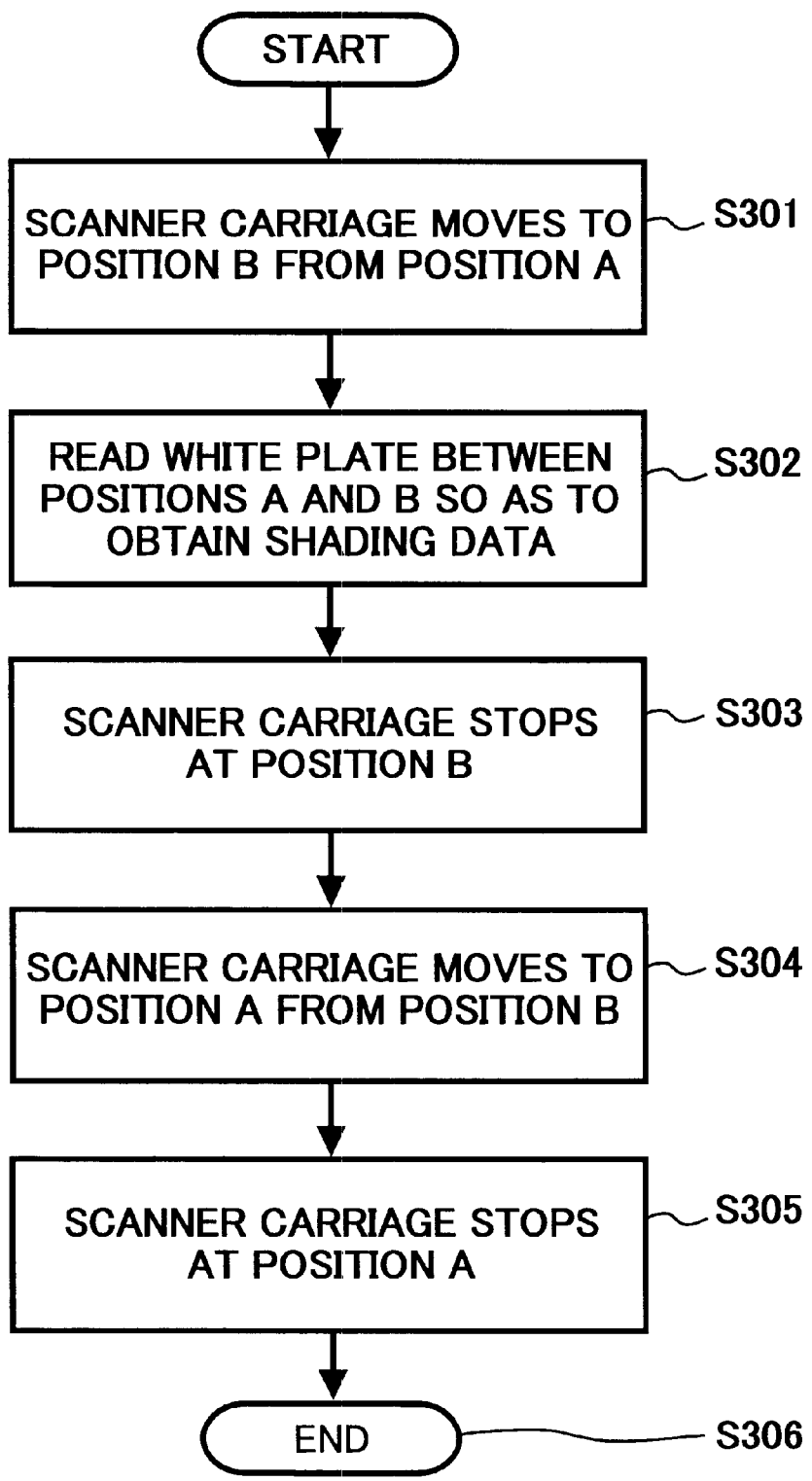
FIG. 3 is a flow chart showing a sheet-through shading operation procedure.

A sheet-through shading operation according to the embodiment of the present invention is performed by taking steps shown in FIG. 3. Referring to FIG. 1, a shading plate 140 (or a white plate) is disposed at a downstream side of the original document reading position 132 in a sheet conveying direction. The white plate 140 is read while a scanner carriage 205 moves from a position A 211 to a position B 212 (step S301) so as to generate shading data (step S302).

The scanner carriage 205 stops at the position B 212 (step S303), move to the position A 211 (step S304), and then stops at position A 211 (step S305). Then, the processing ends (step S306).

A scanner driving motor 204 illustrated in FIG. 2 drives the scanner carriage 205. The scanner carriage 205 includes the exposure lamp 201, and the mirror 202 which leads reflected light from an original document to the CCD 203. In a sheet-through system, a movement of the scanner carriage 205 is required in a shading operation because an original document reading position and a shading plate reading position are separately arranged.

1.5 A hardware configuration of an image forming unit.

Figure 4:
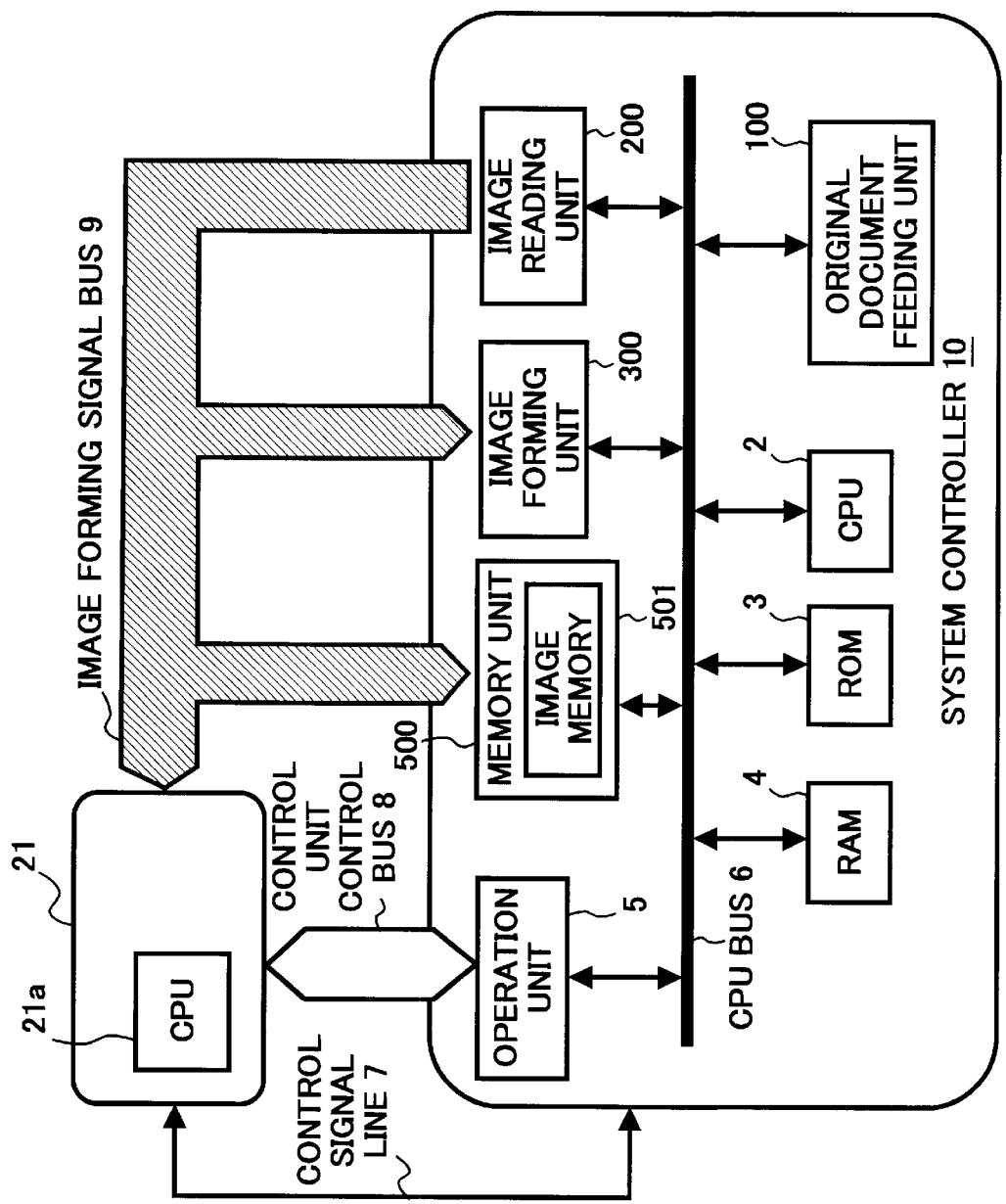
FIG. 4 is a block diagram illustrating a hardware configuration of a digital copying machine.

FIG. 4 is a block diagram illustrating a hardware configuration of a digital copying machine according to the embodiment of the present invention. The digital copying machine 1 includes a copy application 21 having a CPU 21a which controls an operation of the image forming unit 200, and a system controller 10. The system controller 10 controls a memory unit 500 having an image memory 501, the image forming unit 300, the image reading unit 200, the original document feeding unit 100, a CPU 2, a ROM 3, a RAM 4, and an operation unit 5. The copy application 21 and the system controller 10 mutually exchange control signals through control signal line 7. The copy application 21 is connected to the operation unit 5 through a control unit control bus 8. Image data of an image read by the image reading unit 200 is input to the copy application 21, the memory unit 500, and the image forming unit 300 through an image forming signal bus 9, and processing responding to each application is performed.

1.6 A software configuration of an image forming unit.

Figure 5:
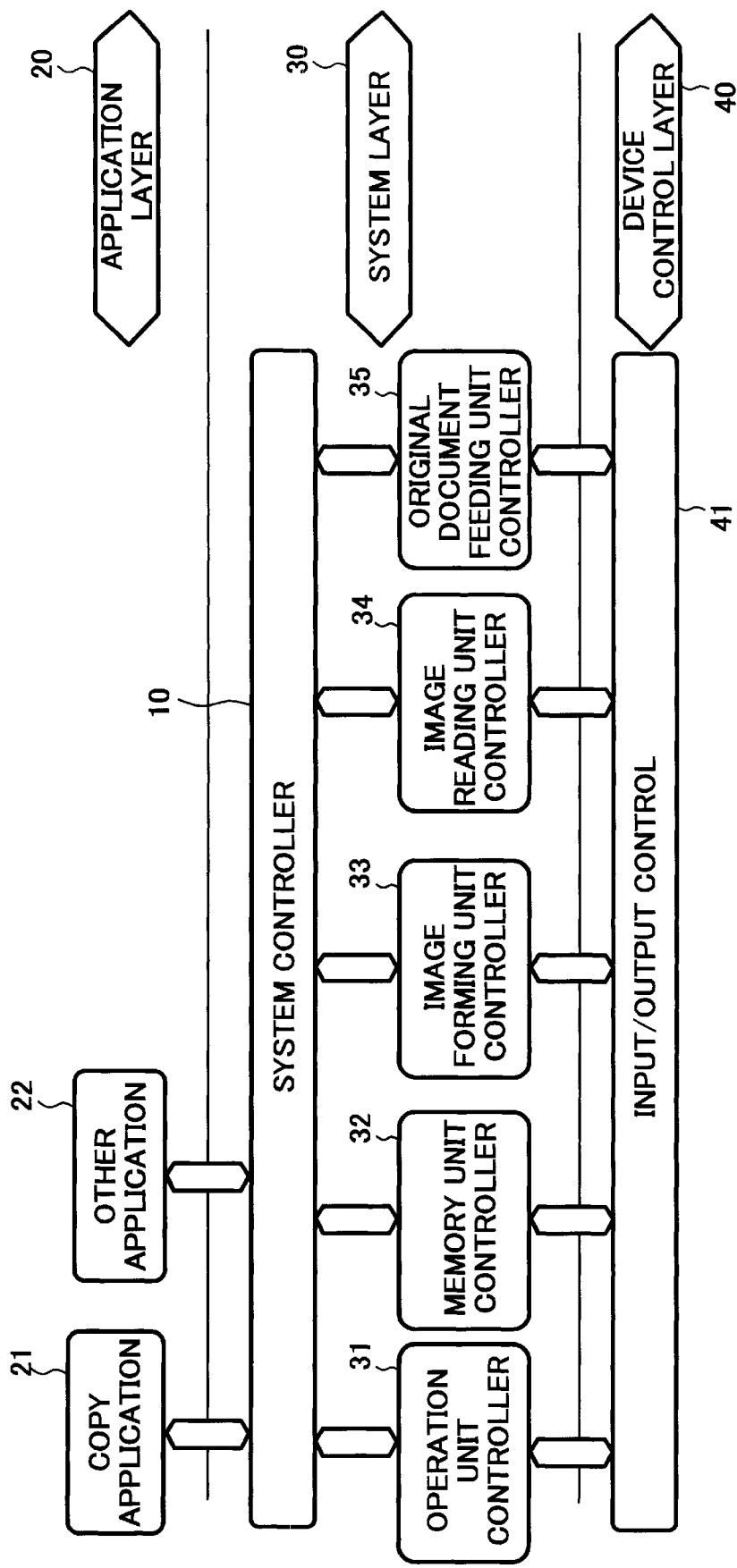
FIG. 5 is a block diagram illustrating a software configuration of a digital copying machine.

FIG. 5 shows a software configuration of a digital copying machine according to the embodiment of the present invention. The software configuration includes 3 layers, namely, an application layer 20, a system control layer 30, and a device control layer 40. The application layer 20 includes the copy application 21, and other applications 22. The system control layer 30 includes an operation unit controller 31, a memory unit controller 32, an image forming unit controller 33, an image reading unit controller 34, and an original document feeding unit controller 35. Each of those controllers 31 to 35 is connected to the system controller 10. Each of controllers 31 to 35 controls operations of the operation unit 5, the memory unit 500, the image forming unit 300, the image reading unit 200, and the original document feeding unit 100, respectively. The device control layer 40 includes an input/output control 41, which is connected to each of the above-described controllers 31 to 35.

Therefore, the digital copying machine 1 can include various applications on top of the copy application 21 by having a multi-tasking system configuration. The copy application 21 controls an image formation. It is necessary to handle a unit of function as a resource, and to control to share one resource by a plurality of applications so as to have the multi-tasking system configuration. The system control layer 30 exerts that control. In the system control layer 30, the system controller 10 exerts control over an input/output of information of each controller 31 to 35 and each application.

The device control layer 40 converts logical instructions provided from the system control layer 30, such as a command, a control signal, etc., into instructions that activate mechanical operations of clutches, sensors, motors, etc., in order to actually operate the apparatus.

There are two types of structures in a mechanism of the original document feeding unit 100. A first structure type executes a sheet feeding operation by carrying out a command control using a serial communication. A second structure type performs a sheet feeding operation by exercising a command control via the control of the CPU 2 of the system controller 10. Either the first structure type or the second structure type of an original document feeding unit can be used. Further, there is a type of a structure for the original document feeding unit 100 in which the original document set sensor 193 is used for detecting a next original document. As an example, in an original document feeding unit having the above-mentioned structure, it is judged that there is a next original document when the original document set sensor 193 stays on after a trailing edge of an original document has passed the registration sensor 101. With this arrangement, whether or not there is the next original document can be judged before a reading operation of an image of a preceding original document is completed.

1.7 A flow of image data in shading correction.

Figure 6:
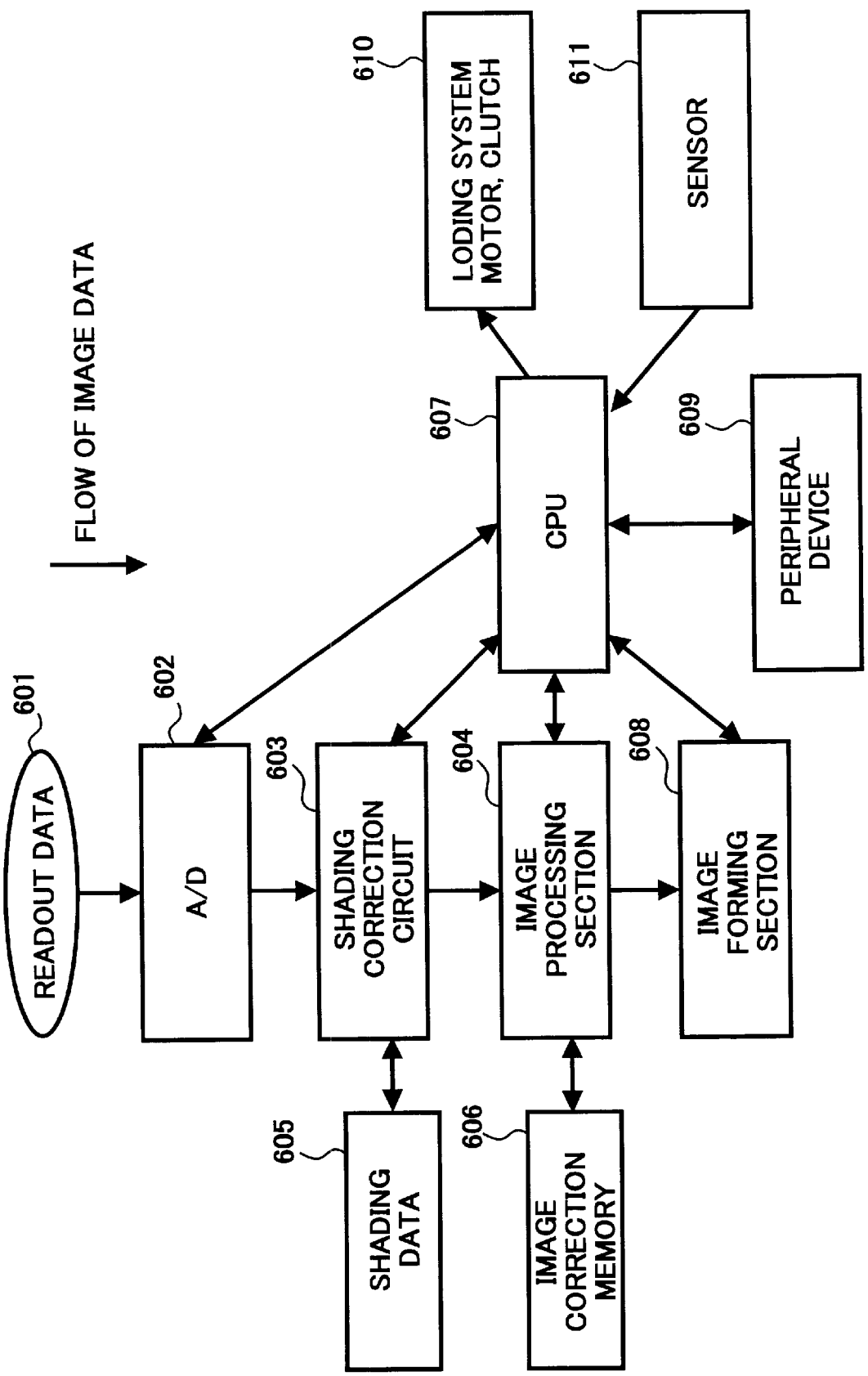
FIG. 6 shows a flow of image data and a hardware configuration for image processing of a digital copying machine.

FIG. 6 shows a flow of image data in shading correction along with a hardware configuration for image processing. Data 601 read by the CCD 203 is converted to digital data by an A/D converter 602 after it has been amplified, and is then fed to a shading correction circuit 603. A correction is made by shading data 605, which has already been acquired by a shading operation and has been stored in a memory. Then, image processing is executed in an image processing section 604 based on corrected data stored in an image correction memory 606, and an image is formed in an image forming section 608 of the image forming unit 300. The A/D converter 602, the shading correction circuit 603, the image processing section 604, and the image forming section 608 are controlled by a CPU 607 (i.e., similar to the CPU 2 in FIG. 4).

The digital copying machine I includes a timer in a peripheral device 609. A counter is periodically counted up, and a time measurement is carried out based on it. Lighting periods of various lamps are controlled by the measured time. Herein, it is assumed that the exposure lamp 201 is turned off when there is no indication for a next operation for a predetermined period of time after an image is read. Loading system 610, such as a motor, a clutch, etc., and a sensor 611 are connected to the CPU 607, and they are controlled by the CPU 607. Software for operating the peripheral device 609, the loading system 610, and the sensor 611, etc., are included in the device control layer 40.

1.8 Synchronization between a transfer sheet and an original document to be read.

Figure 7:
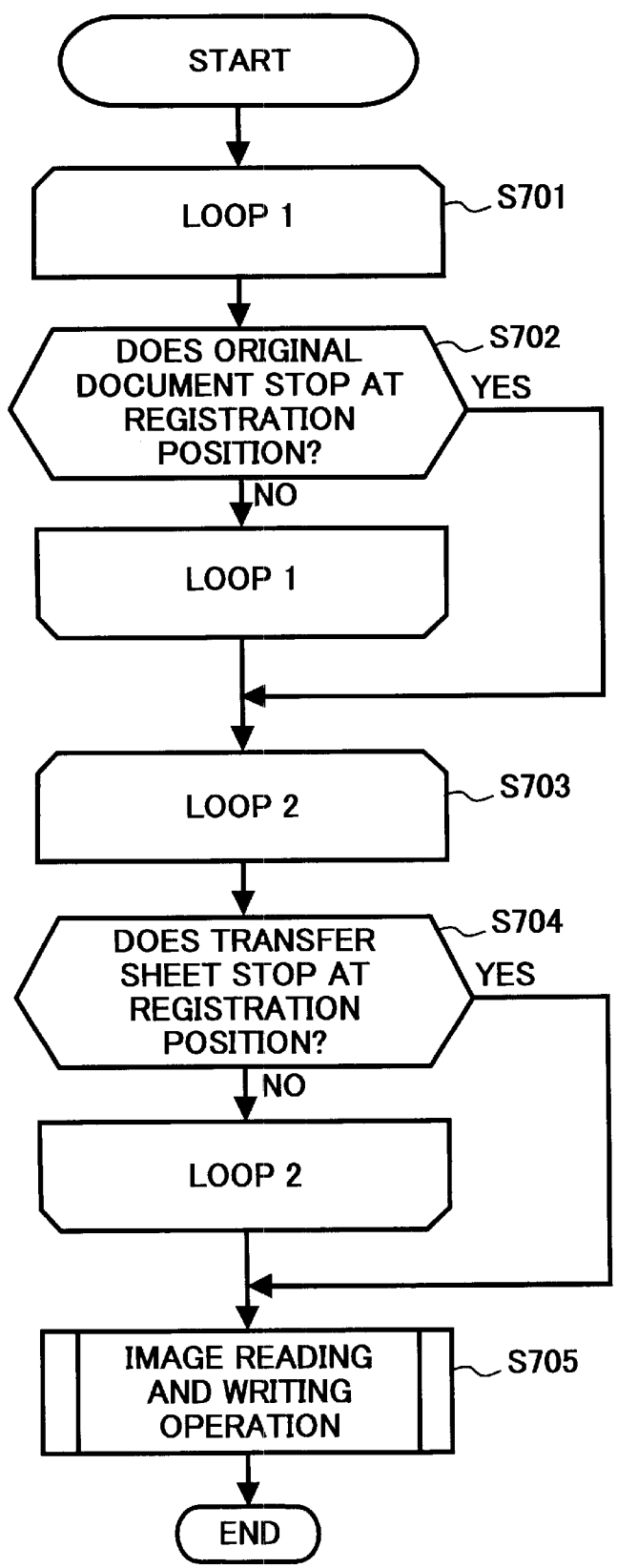
FIG. 7 is a flow chart showing a processing procedure for setting a time to synchronize an original document to be read and a transfer sheet.

An original document to be read and a transfer sheet must be synchronized in a copying machine without limiting to the digital copying machine 1. FIG. 7 shows a timing for maintaining the synchronization. When an instruction for a "copy start" is given, image reading and writing operations (step S705) start only after a preparation of an original document and a transfer sheet is completed (steps S701 to S704). In the case of a facsimile, synchronization between a preparation of an application for the facsimile and an image reading operation is required.

In FIG. 7, a first step S701 is indicated as "Loop 1" which indicates an operation of awaiting for an original document. That Loop 1 step S701 will end when the original document stops at the registration position, i.e. when yes in step S702. Also, in FIG. 7 the Loop 2 step S703 is a step of awaiting for a transfer sheet, which step ends when the transfer sheet stops at the registration position, i.e. yes at step S704.

1.9 A shading operation.

A shading operation according to the embodiment of the present invention is now explained below.

Figure 8:
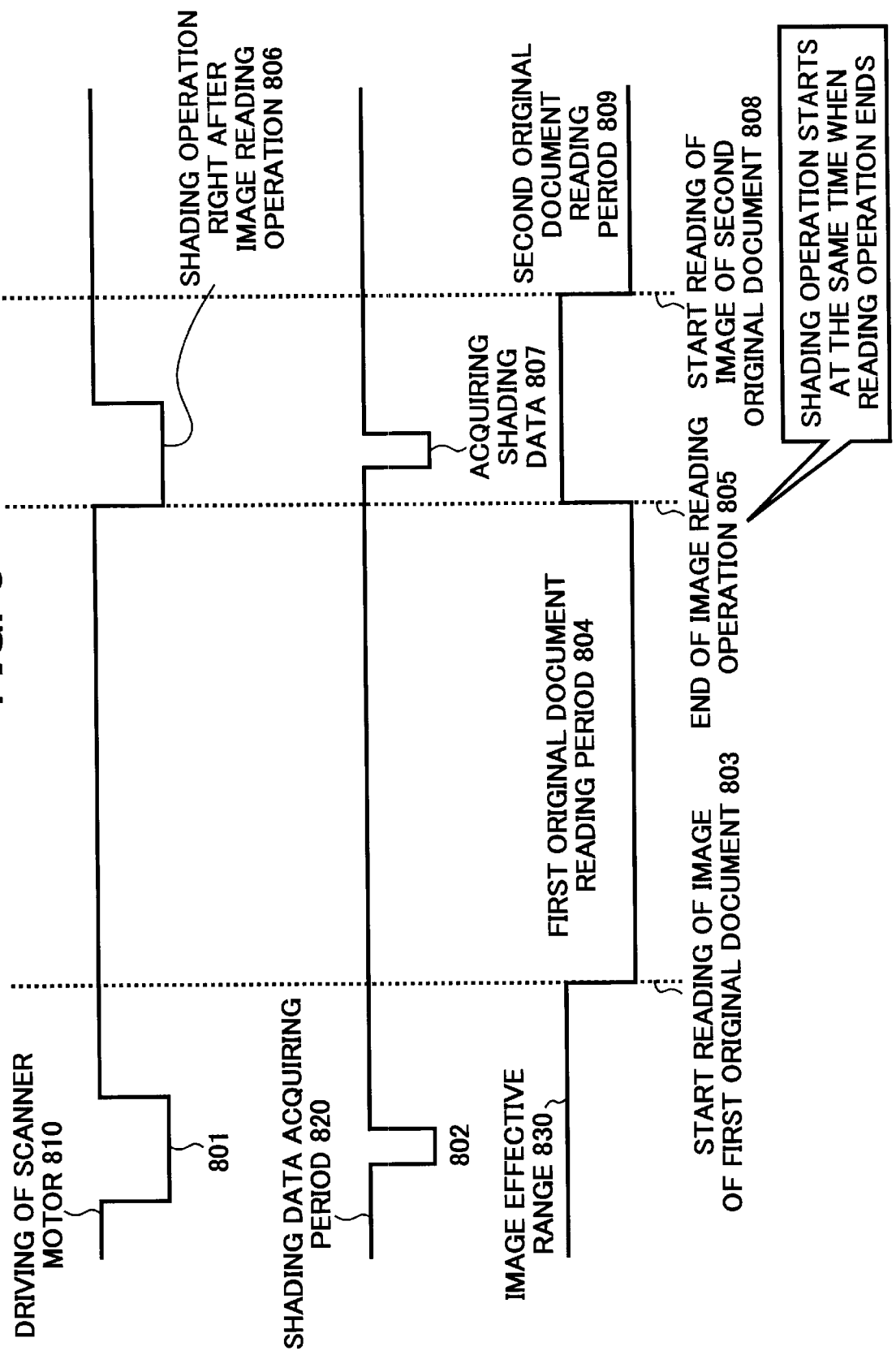
FIG. 8 is a timing diagram showing a time for (1) a shading operation with a driving of a scanner motor, (2) a shading data acquiring period, and (3) an image effective range, according to an embodiment of the present invention.

Herein, the explanation is given under a condition that 2 sheets of original documents are read. The same control exerted on reading 2 sheets of original documents is required when 3 or more sheets of original documents are read. A shading operation described below includes the following operations, namely, (1) the scanner carriage 205 moves to a position where the shading plate 140 is positioned from the original document reading position 132, (2) acquiring shading data, and (3) the scanner carriage 205 moves back to the original document reading position 132. FIG. 8 shows a timing to perform a shading operation right after an image reading operation is performed.

FIG. 8 is a timing diagram showing a time for (1) the shading operation with a driving of a scanner motor 810, (2) a shading data acquiring period 820, and (3) an image effective range 830. In FIG. 8, a time for the following are shown: a start of reading of an image of a first original document 803; an end of reading of the image of the first original document 805; a start of reading of an image of a second original document 808; shading operations 801 and 806; shading data acquiring periods 802 and 807; and original document reading periods 804 and 809.

The following four cases (1)–(4) arise in which a shading operation is performed.

(1) In reading an image of a first original document, a shading operation is performed twice, i.e., before reading the image of the original document, and after the image of the original document has been read (i.e., immediately after necessary image data has been obtained).

Figure 9:
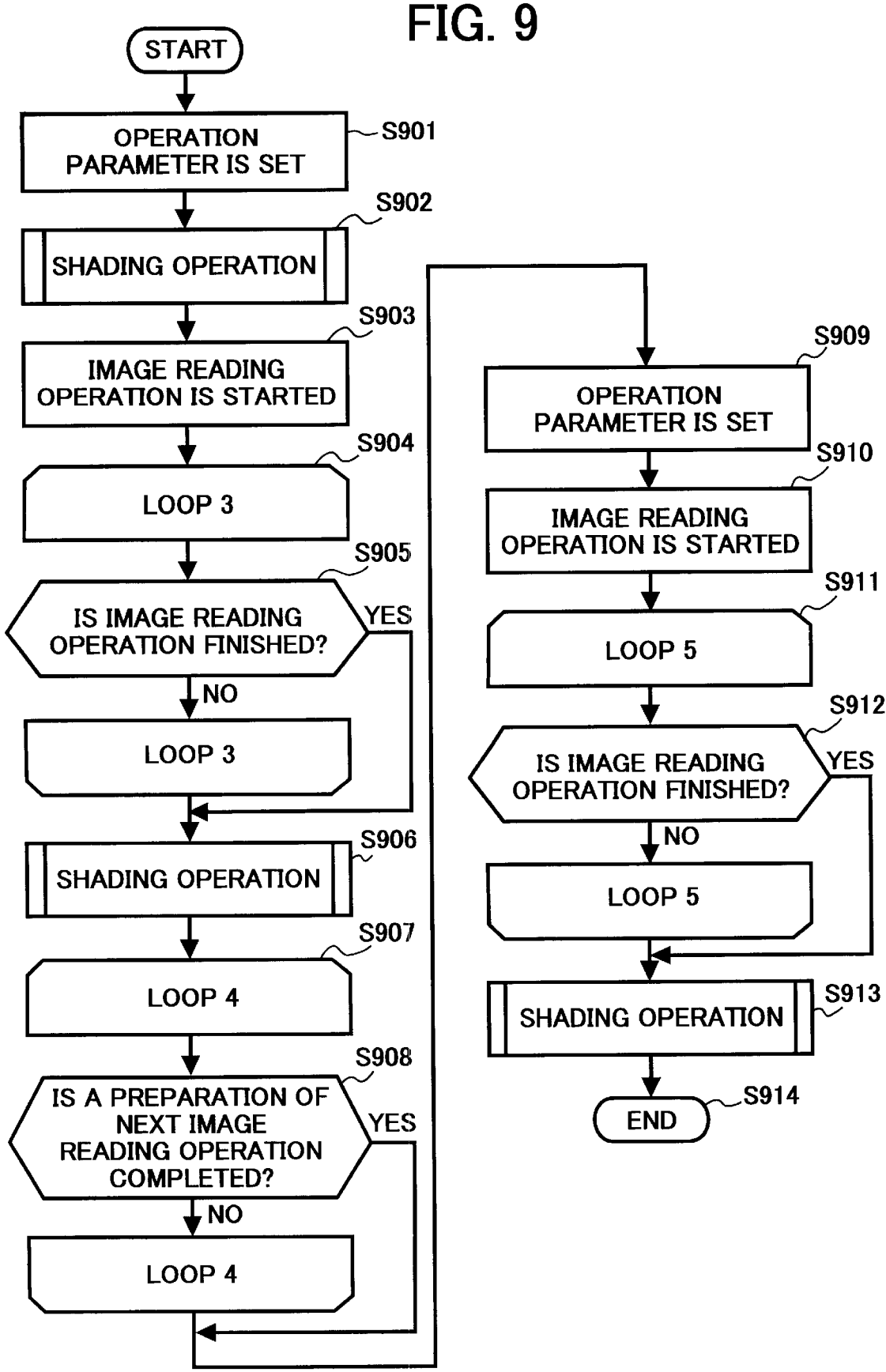
FIG. 9 is a flow chart showing a control procedure of a shading operation, according to an embodiment of the present invention.

A first half portion of FIG. 9 is a flow chart which shows a control procedure of the shading operation. In this processing, an operation parameter, which is necessary for a shading operation and an image reading operation, is initially set (step S901), and then the shading operation is performed (step S902). After the shading operation has been performed, an image reading operation is started (step S903) to read an image of an original document (step S904; Loop 3 is a loop for reading the image of the original document until the reading is completed). After the image has been read (step S905), the shading operation is carried out (step S906).

With this processing, when a first original document is read in an apparatus in which a shading operation is carried out by moving the scanner carriage 205, the shading operation is performed before reading the image of the original document. Then, the shading operation is also performed after the original document has been read (immediately after necessary data has been obtained). With this arrangement, throughput of continuous reading of a plurality of original documents is increased because a shading operation for a next original document has been performed before the original document is conveyed to an image reading position.

(2) A shading operation for a second original document is not performed before reading an image of the second original document because the shading operation has been performed when an image reading operation of the first original document is completed.

A second half portion of FIG. 9 shows a control procedure for the shading operation. After the shading operation has been performed (step S907; Loop 4 is an operation for a preparation of a next image reading operation until the preparation is completed), and then a preparation for a next image reading operation has been completed (step S908), an operation parameter is set (step S909). Then, an image reading operation starts (step S910) to read an image of an original document (step S911; Loop 5 is an operation for reading the image of the original document until the reading is completed). After the image has been read (step S912), the shading operation is performed (step S913), and then the processing is finished.

With this processing, a shading operation for a next original document is not performed when the shading operation is performed immediately after the image of the first original document is read, which will result in an increase of throughput of continuous reading of a plurality of original documents.

(3) After a shading operation, which is performed after an image of a first original document is read, is carried out, when a preparation time is required due to a preparation of a transfer sheet, etc., before reading an original document, and when a control which turns off the exposure lamp 201 is exercised during the preparation time, the exposure lamp 201 has to be turned on again. In this case, the shading operation is performed again in order to obtain a high quality image.

Figure 10:
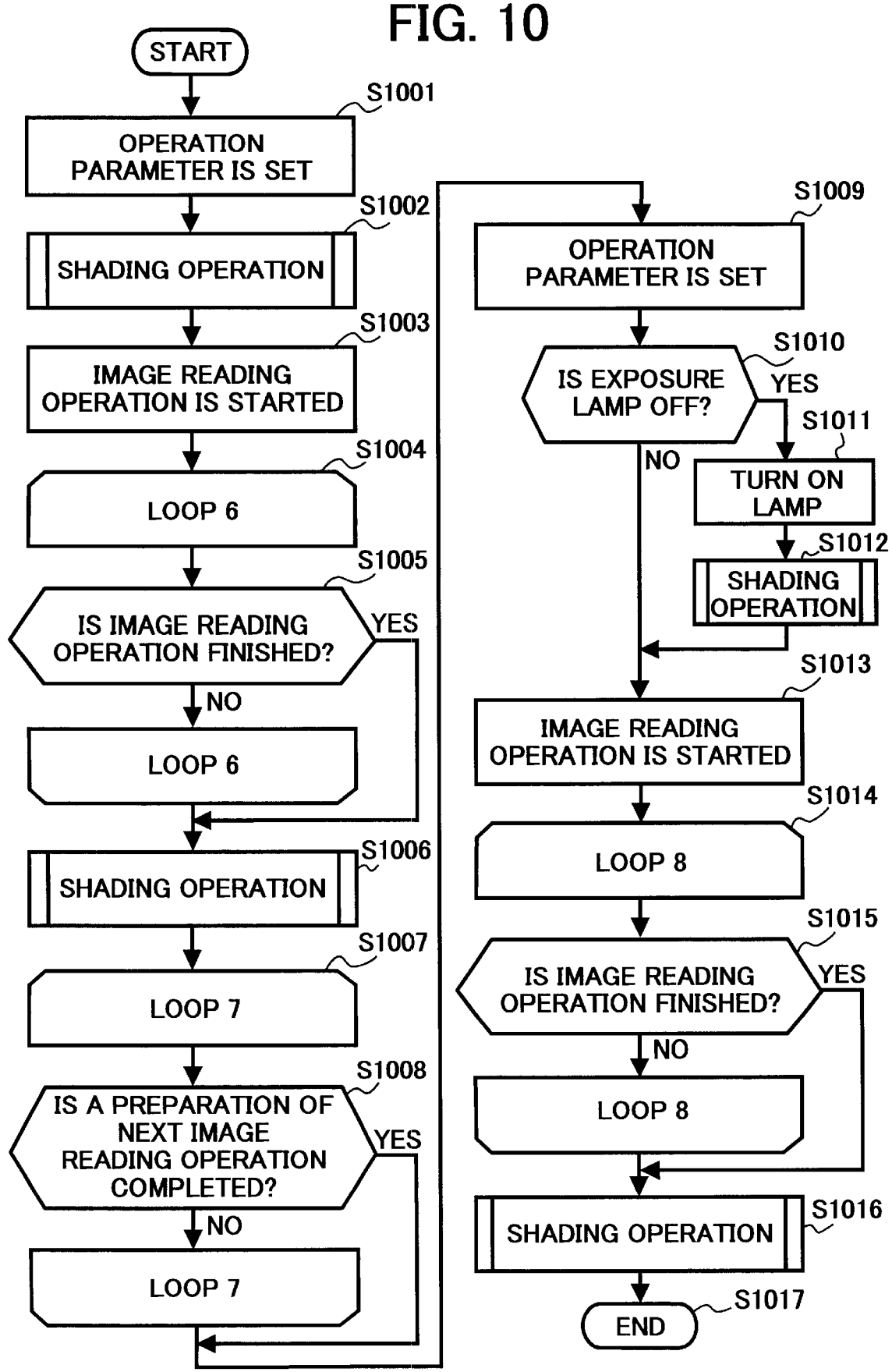
FIG. 10 is a flow chart showing a control procedure of a shading operation when an exposure lamp is turned off, according to an embodiment of the present invention.

FIG. 10 is a flow chart showing a control procedure of the shading operation. In this processing, an operation parameter, required for a shading operation and an image reading operation, is set initially (step S1001), and then the shading operation is performed (step S1002). After the shading operation has been performed, the image reading operation starts (step S1003) to read an image of an original document (step S1004; Loop 6 is an operation for reading the image of the original document until the reading is completed). The shading operation is performed (step S1006) after the image has been read (step S1005). The above-described operations are performed for a first original document. When a preparation for reading an image of a next original document is completed (step S1008) after the shading operation is performed (step S1007; Loop 7 is an operation for a preparation of a next image reading operation until the preparation is completed), an operation parameter is set (step S1009). The same control procedure as that described in FIG. 9 is followed up to this step.

Next, whether or not the exposure lamp 201 is turned off is judged (step S1010). If the exposure lamp 201 is turned off (yes in step S1010), the exposure lamp 201 is then turned on (step S1011), and then the shading operation is performed (step S1012). Then, an image reading operation is started (step S1013) to read an image of a second original document. A shading operation is performed (step S1016) after the image of the second original document has been read (steps S1014 and S1015), and then the processing is finished (step S1017; Loop 8 is an operation for reading the second original document until the reading is completed).

That is, when the exposure lamp 201 is turned off during the waiting time for synchronizing operations, etc., after a shading operation which is performed after the image of the first original document is read, the shading operation is performed again by turning the exposure lamp 201 on before reading the image of the next original document so as to obtain appropriate shading data.

(4) It may happen that a preparation time is required before reading an image of a next original document due to a preparation of synchronizing operations, etc., after a shading operation which is performed after the image of the first original document is read. In such a case, the shading operation is performed again in order to obtain a high quality image.

Figure 11:
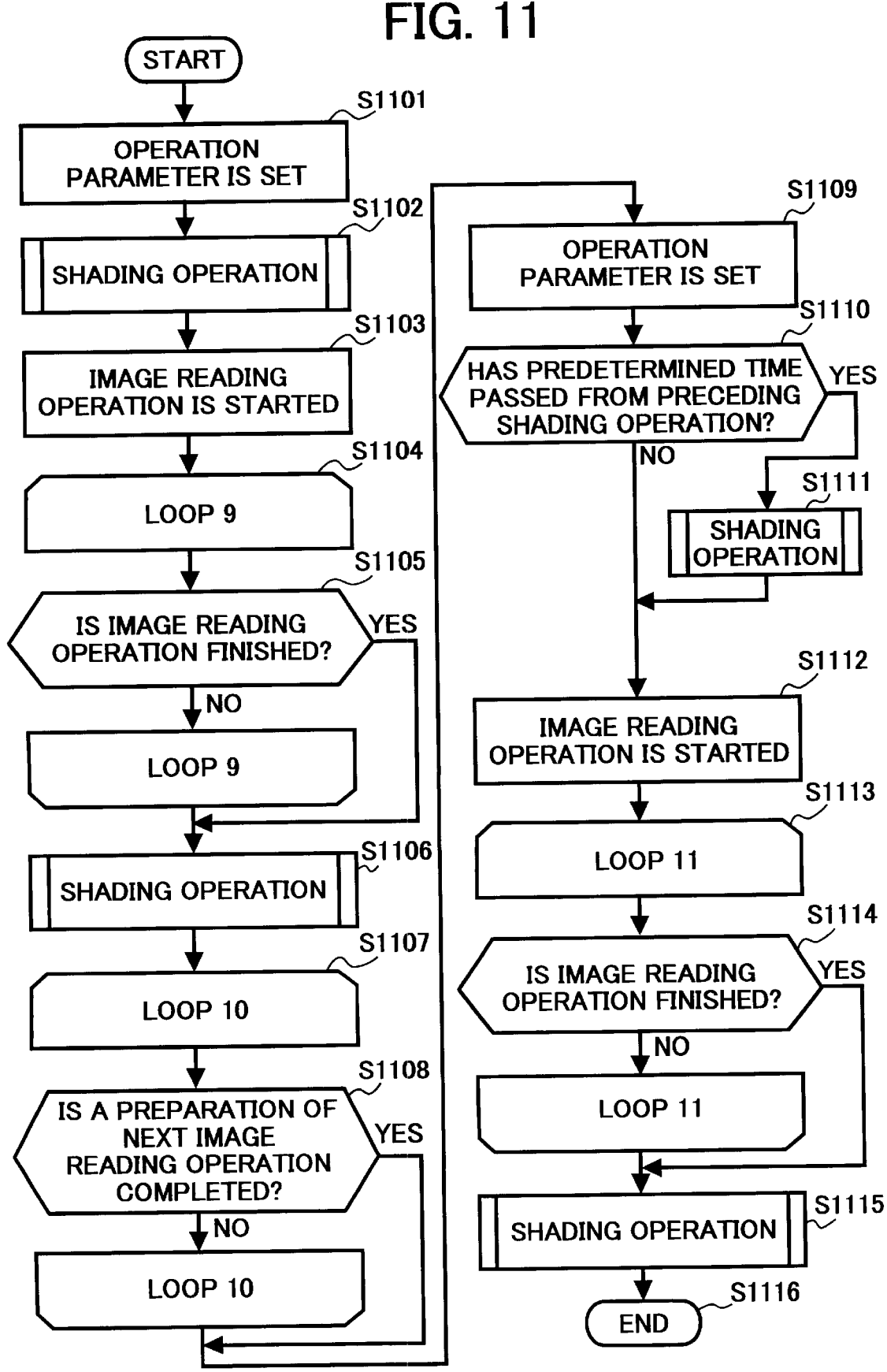
FIG. 11 is a flow chart showing a control procedure of a shading operation when a predetermine time has passed after the preceding shading operation is performed, according to an embodiment of the present invention.

FIG. 11 is a flow chart showing a control procedure of a shading operation. In this processing, an operation parameter necessary for a shading operation and an image reading operation is set (step S1101), and then the shading operation is performed (step S1102). After the shading operation has been performed, the image reading operation is started (step S1103) to read an image of an original document (step S1104; Loop 9 is an operation for reading the image of the original document until the reading is completed). After the image has been read (step S1105), the shading operation is performed (step S1106). The above-described operations are performed for a first original document. An operation parameter is then set (step S1109) after a shading operation has been performed (step S1107; Loop 10 is an operation for a preparation of a next image reading operation until the preparation is completed), and a preparation for a next image reading operation has been completed (step S1108). The same control procedure as that described in FIGS. 9 and 10 is followed up to this step.

Next, whether or not a predetermined time has passed after a preceding shading operation is performed is judged (step S1110). A shading operation is performed (step S1111) when it is judged that the predetermined time has passed (yes in step S1110). An image reading operation for a second original document is then started (step S1112) when it is judged that the predetermined time has not passed or when the shading operation has been performed in the step S1111. After the image has been read (step S1113 and S1114; Loop 11 is an operation for reading the image until the reading is completed), the shading operation is performed (step S1115), and then the processing is finished (step S1116).

As described above, a shading operation is performed after an original document has been read. Then, the shading operation is performed before reading the image of a next original document when the exposure lamp 201 stays on for a longer period of time due to a wait time for synchronizing operations, etc. With this arrangement, appropriate shading data is obtained without being significantly affected by an aging variation of the exposure lamp 201.

2. A second embodiment

Acquiring shading data for a next original document, in a case in which an operator switches an image quality mode or a background removal mode when a plurality of original documents are being read, is not considered in the above-described first embodiment. Therefore, an image forming operation is carried out by obtaining shading data again in the second embodiment when the switching of the above-mentioned modes takes place.

The same constructions and operations as described in the sections between "1.1 A construction of an image forming apparatus (e.g., a digital copying machine)" and "1.8 A synchronization between a transfer sheet and an original document to be read" in the first embodiment apply to the second embodiment. A description of those identical constructions and operations is omitted in describing the second embodiment.

According to the second embodiment, a fouling and a faint color which may appear on a background of images are removed in a background removal mode by cutting certain signals in a low level of signals read when an image of an original document is read. A black dot, dirt, and a light color on the background of images, which are read by a scanner, are thus removed. This mode is user-selectable. An operation key, labeled such as "Automatic Density" or "Background Removal", may be arranged in an operation unit. The background of images is removed by processing acquired shading data. The processing of shading data for removing the background of images is commonly known.

The mode may be selected by depressing a key disposed in the operation unit 5 illustrated in FIG. 4. The depression of the key is reported from the operation unit 5, and ON-OFF is switched by a toggle.

An image quality mode in a digital copying machine includes a mechanism that changes a quality of an image by performing image processing in the image processing section 604 illustrated in FIG. 6. The image processing includes error diffusion processing, dither processing, and so forth. Generally, a switching key having indications such as for a "Character", a "Character and Photograph", and a "Photograph" are arranged in the operation unit 5 for selecting the processing. By depressing the appropriate switching key, a setting of the function of the background removal mode is also automatically switched. For example, when the key is switched to the "Character" mode or the "Character and Photograph" mode, the background removal function is switched on, while if the key is switched to the "Photograph" mode the background removal function is switched off. Generally, a background is not removed in the "Photograph" mode because a tone is emphasized in a photograph. However, the setting of the modes is variable, and is not limited to what is described above.

An operator can select the modes by depressing the key. The depression of the key is reported from the operation unit 5, and the mode changes according to the switching of the mode by depressing the switching key.

A shading operation according to the second embodiment of the present invention is now described below.

Herein, the explanation is given based on a shading operation performed in reading an image of a first original document of a plurality of original documents. As described above, the shading operation described below includes the following operations, (1) the scanner carriage 205 moves to the position where the shading plate 140 is positioned from the original document reading position 132, (2) acquiring shading data, and (3) the scanner carriage 205 moves back to the original document reading position 132.

Figure 12:
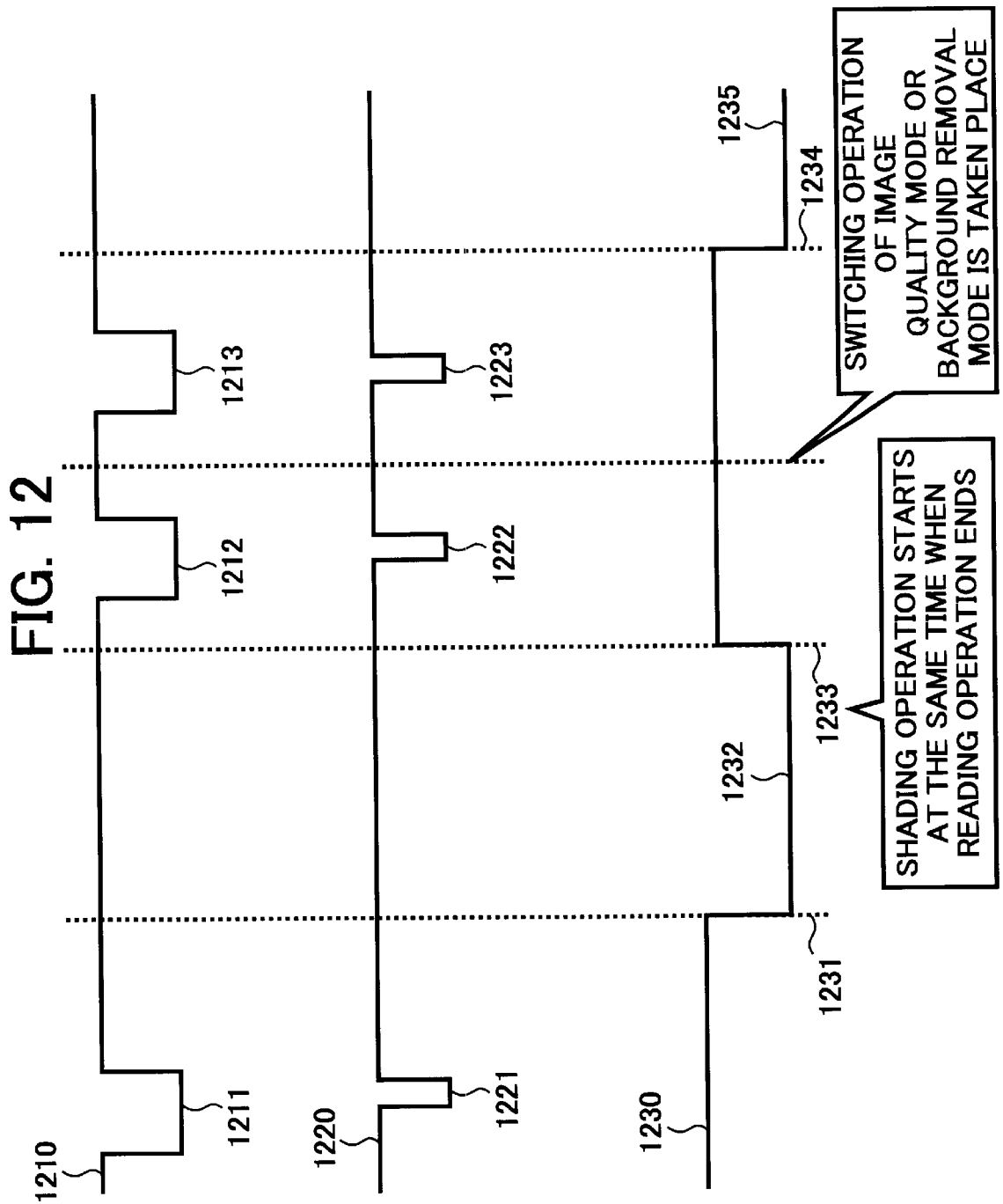
FIG. 12 is a timing diagram showing a time for (1) a shading operation with a driving of a scanner motor, (2) a shading data acquiring period, and (3) an image effective range, when a switching of an image quality mode or that of a background removal mode is taken place according to an embodiment of the present invention.

A time to perform a shading operation right after an image reading operation is shown in FIG. 12. FIG. 12 is a timing diagram showing a time for (1) the shading operation with a driving of a scanner motor 1210, (2) a shading data acquiring period 1220, and (3) an image effective range 1230. In FIG. 12, a time for the following are shown: a start of reading of an image of a first original document 1231; an end of reading of the image of the first original document 1233; a start of reading of an image of a second original document 1234; shading operations 1211, 1212, and 1213; shading data acquiring periods 1221, 1222, and 1223; and original document reading periods 1232 and 1235.

The shading operation 1212 and the shading data acquiring operation 1222 are performed immediately after the reading of the image of the first original document 1233 is read as shown in the timing diagram of FIG. 12. When a switching operation of an image quality mode or a background removal mode is performed, the shading operation 1213 and the shading data acquiring operation 1223 are performed again after the shading operation 1212, and the shading data acquiring operation 1222, which were performed after the image of the first original document was read. That is, processing, which performs the shading operation 1213 and the shading data acquiring operation 1223 before reading an image of a second original document, is inserted in FIG. 8 when a switching operation of an image quality mode or a background removal mode is performed immediately after the image of the first original document is read.

Accordingly, when a switching operation of an image quality mode or a background removal mode is performed during a reading operation of an image of an original document, the switched mode cannot be applied to the original document being read, but it can be applied to the next original document to be read. Thus, whether or not a condition of an image quality mode and a background removal mode differs from that of the last executed operation is judged when an image of the next original document is read. A shading operation is performed when it is judged that the condition is different from that of the last executed operation (i.e., a switching operation of an image quality mode or a background removal mode is performed). When a change in an image quality mode and a background removal mode is made, it is necessary to perform a shading operation again before the next image reading operation starts in a method in which a shading operation is performed immediately after an image reading operation is performed. The expressions of "an occurrence of switching of an image quality mode" and "an occurrence of a switching of background removal mode" in the following description shows that a mode, which is different from that was set when an image of the preceding original document was read, is set.

Figure 13:
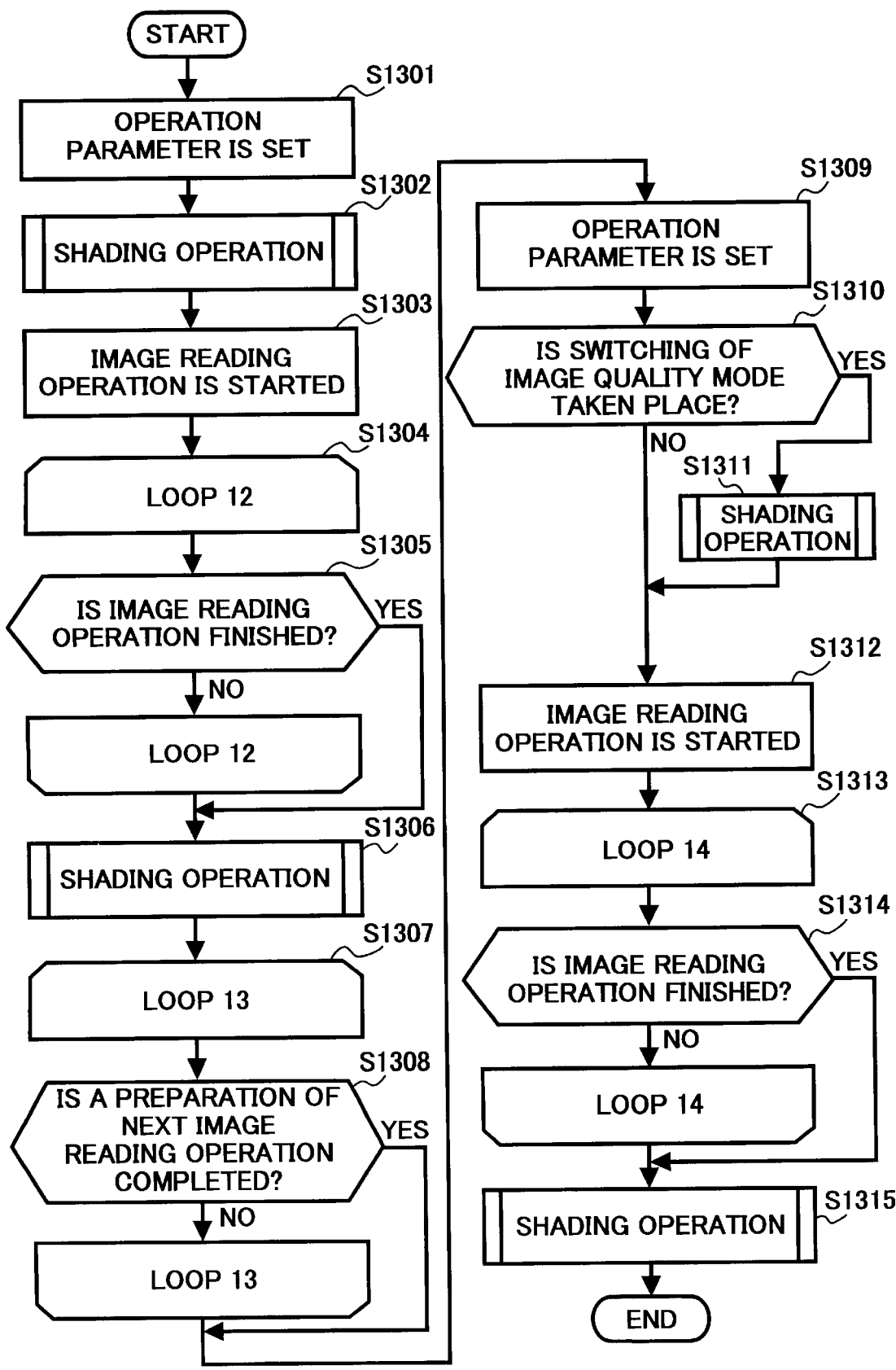
FIG. 13 is a flow chart showing a control procedure of a shading operation according to an embodiment of the present invention, when a switching of an image quality mode takes place.
Figure 14:
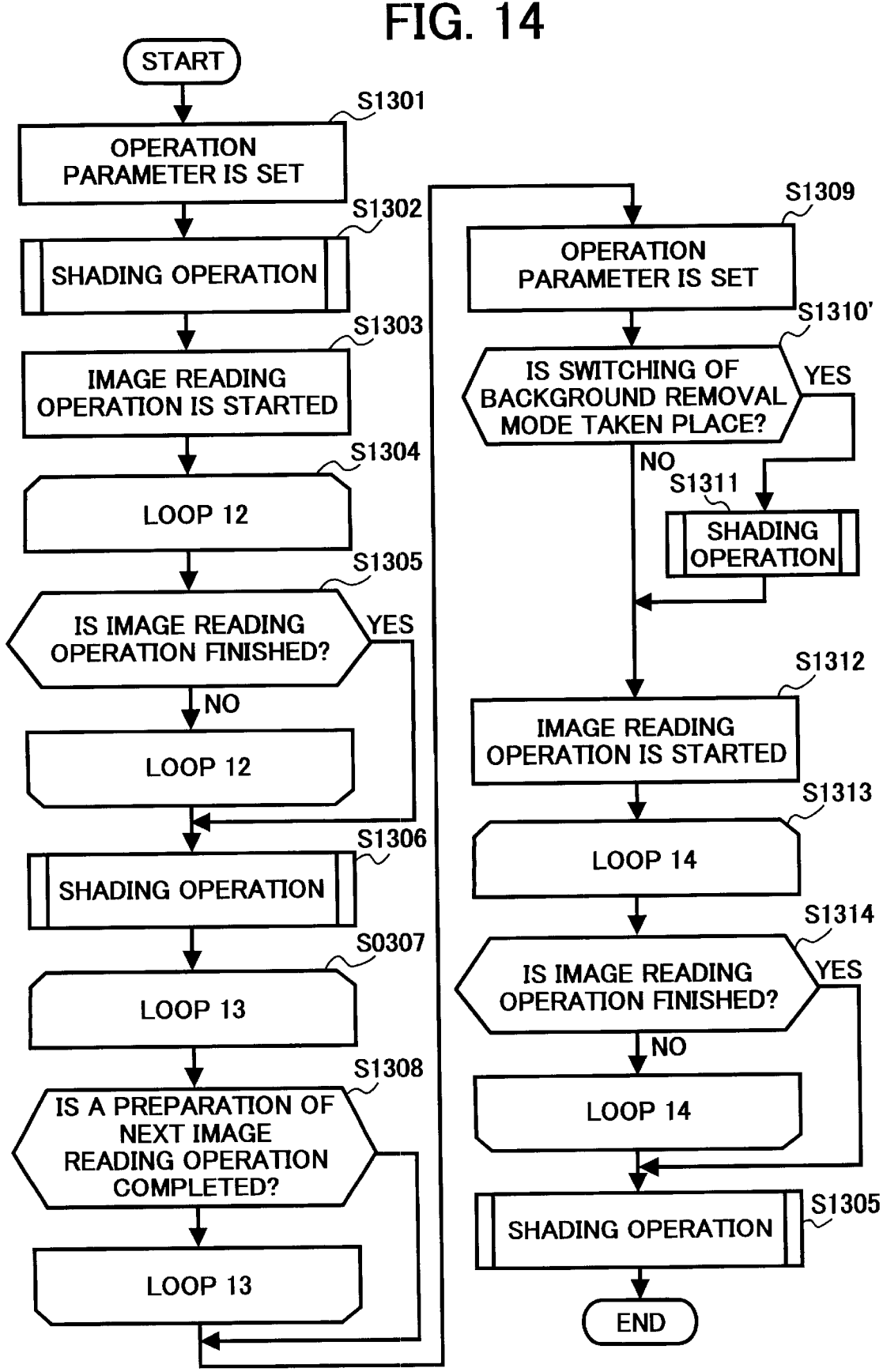
FIG. 14 is a flow chart showing a control procedure of a shading operation according to an embodiment of the present invention, when a switching of a background removal mode takes place.

The operations are now explained by referring to the flow charts in FIGS. 13 and 14.

FIG. 13 is a flow chart showing a processing procedure when a switching of an image quality mode takes place after two shading operations have been performed in reading an image of a first original document, i.e., both before and after (i.e., immediately after necessary image data has been obtained) reading the image of the first original document. In this processing, an operation parameter, which is necessary for a shading operation and an image reading operation, is initially set (step S1301), and then the shading operation is performed (step S1302). After the shading operation has been performed, the image reading operation is started (step S1303) to read an image of an original document (step S1304; Loop 12 is an operation for reading the image of the original document until the reading is completed). After the image has been read (step S1305), the shading operation is performed (step S1306). An operation parameter for a next original document is set (step S1309) after the shading operation has been performed (step S1307; Loop 13 is an operation for a preparation of a next image reading operation until the preparation is completed), and a preparation for a next image reading operation has been completed (step S1308). Then, whether or not a switching of an image quality mode has taken place is judged (step S1310). When it is judged that the switching of the image quality mode has been performed (yes in step S1310), the shading operation is performed (step S1311). An image reading operation is started (step S1312) after the shading operation has been performed, and the shading operation is performed (step S1315) after the image reading operation has been performed (step S1314; Loop 14 is an operation for reading the image until the reading is completed). The same operations from the step S1307 to step S1315 are repeated when there is a next original document.

FIG. 14 is a flow chart showing a processing procedure when a switching of a background removal mode takes place after two shading operations have been performed in reading an image of a first original document, i.e., both before and after (i.e., immediately after necessary image data has been obtained) reading the image of the first original document. In FIG. 14, whether or not a switching of a background removal mode has taken place is judged (step S1310') instead of the judgement of whether or not a switching of an image quality mode has taken place (step S1310) in FIG. 13. Because other processing procedures are the same as those in FIG. 13, the description, which is identical to that of in FIG. 13, is omitted.

In a case in which a shading operation is performed immediately after an image reading operation has been performed considering the productivity, a high quality image reading operation responding to user needs can be implemented even when a switching of an image quality mode takes place, because an appropriate shading operation is performed. Additionally, an image reading operation, which satisfies user needs of the last moment, can be performed because whether or not a switching of an image quality mode or a switching of a background removal mode has been performed is judged just before the image reading operation is started. Because a shading operation was performed when an image of a first original document was read, an image of a second original document can be read without performing the shading operation when neither the switching of the image quality mode nor the switching of the background removal mode has taken place.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United Stated is:

1. An image reading device, comprising:
an exposure optical system configured to read images of a first original document and a second original document conveyed on a platen at a fixed speed;
a shading plate configured to be read by said exposure optical system for correcting a white level of the read image information;
a carriage configured to move an image reading position of said exposure optical system for reading said shading plate; and
a controller configured to move said carriage to a position where said shading plate is disposed so as to perform a shading operation before and after reading the image of the first original document, and to not perform a further shading operation before reading the image of the second original document.

2. An image reading device, comprising:
an exposure optical system configured to read an image of an original document conveyed on a platen at a fixed speed;
a shading plate configured to be read by said exposure optical system for correcting a white level of the read image information;
a carriage configured to move an image reading position of said exposure optical system for reading said shading plate; and
a controller configured to control said carriage such that a shading operation is performed immediately after an image of a next original document is read without performing the shading operation before reading the image of the next original document when the shading operation is performed after an image of the original document is read.

3. The image reading device according to claim 2, wherein said controller moves said carriage to a position where said shading plate is disposed so as to perform the shading operation before reading the image of the next original document when an exposure lamp is turned off before reading the image of the next original document.

4. The image reading device according to claim 2, wherein said controller moves said carriage to a position where said shading plate is disposed so as to perform the shading operation before reading the image of the next original document when a predetermined time has passed after the image of the original document is read.

5. An image reading device, comprising:
an exposure optical system configured to read an image of an original document conveyed on a platen at a fixed speed;
a shading plate configured to be read by said exposure optical system for correcting a white level of the read image information;
a carriage configured to move an image reading position of said exposure optical system for reading said shading plate; and
a controller configured to move said carriage to a position where said shading plate is disposed so as to perform a shading operation before reading the image of the original document,
wherein, in a case in which images of a plurality of original documents are read, said controller controls the device such that a switched image quality mode is set and the shading operation is performed before an image of a next original document is read when an image quality mode set for reading an image of a preceding original document is switched before the image of the next original document is read.

6. An image reading device, comprising:
an exposure optical system configured to read an image of an original document conveyed on a platen at a fixed speed;
a shading plate configured to be read by said exposure optical system for correcting a white level of the read image information;

a carriage configured to move an image reading position of said exposure optical system for reading said shading plate; and a controller configured to move said carriage to position where said shading plate is disposed so as to perform a shading operation before reading the image of the original document, wherein, a case in which images of a plurality of original documents are read, said controller controls the device such that a switched background removal mode is set and the shading operation is performed before an image of a next original document is read when a background removal mode set for reading an image of a preceding original document is switched before the image of the next original document is read.

7. An image forming apparatus, comprising:

an image processing device configured to perform predetermined signal processing based on image data input from the image reading device recited in claim 1; and an image forming device configured to form a visible image based on the image signals processed by said image processing device.

8. An image forming apparatus, comprising:

an image processing device configured to perform predetermined signal processing based on image data input from the image reading device recited in claim 2; and an image forming device configured to form a visible image based on the image signals processed by said image processing device.

9. An image forming apparatus, comprising:

an image processing device configured to perform predetermined signal processing based on image data input from the image reading device recited in claim 5; and an image forming device configured to form a visible image based on the image signals processed by said image processing device.

10. An image forming apparatus, comprising:

an image processing device configured to perform predetermined signal processing based on image data input from the image reading device recited in claim 6; and an image forming device configured to form a visible image based on the image signals processed by said image processing device.

11. An image reading device, comprising:

exposure optical means for reading an image of an original document conveyed on a platen at a fixed speed;

shading plate means to be read by said exposure optical means for correcting a white level of the read image information;

carriage means for moving an image reading position of said exposure optical means for reading said shading plate means; and control means for moving said carriage means to a position where said shading plate means is disposed so as to perform a shading operation before and after reading the image of the original document.

12. An image reading device, comprising:

exposure optical means for reading an image of an original document conveyed on a platen at a fixed speed;

shading plate means to be read by said exposure optical means for correcting a white level of the read image information;

carriage means for moving an image reading position of said exposure optical means for reading said shading plate means; and control means for controlling said carriage means such that a shading operation is performed immediately after an image of a next original document is read without performing the shading operation before reading the image of the next original document when the shading operation is performed after an image of the original document is read.

13. The image reading device according to claim 12, wherein said control means moves said carriage means to a position where said shading plate means is disposed so as to perform the shading operation before reading the image of the next original document when an exposure lamp is turned off before reading the image of the next original document.

14. The image reading device according to claim 12, wherein said control means moves said carriage means to a position where said shading plate means is disposed so as to perform the shading operation before reading the image of the next original document when a predetermined time has passed after the image of the preceding original document is read.

15. An image reading device, comprising:

exposure optical means for reading an image of an original document conveyed on a platen at a fixed speed;

shading plate means to be read by said exposure optical means for correcting a white level of the read image information;

carriage means for moving an image reading position of said exposure optical means for reading said shading plate means; and control means for moving said carriage means to a position where said shading plate means is disposed so as to perform a shading operation before reading the image of the original document, wherein, in a case in which of a plurality of original documents are read, said control means controls the device such that a switched image quality mode is set and the shading operation is performed before an image of a next original document is read when an image quality mode set for reading an image of a preceding original document is switched before the image of the next original document is read.

16. An image reading device, comprising:

exposure optical means for reading an image of an original document conveyed on a platen at a fixed speed;

shading plate means to be read by said exposure optical means for correcting a white level of the read image information;

carriage means for moving an image reading position of said exposure optical means for reading said shading plate means; and control means for moving said carriage means to a position where said shading plate means is disposed so as to perform a shading operation before reading the image of the original document, wherein, in a case in which images of a plurality of original documents are read, said control means controls the device such that a switched background removal mode is set and the shading operation is performed before an image of a next original document is read when a background removal mode set for reading an image of a preceding original document is switched before the image of the next original document is read.

17. An image forming apparatus, comprising:

image processing means for performing predetermined signal processing based on image data input from the image reading device recited in claim 11; and an image forming means for forming a visible image based on the image signals processed by said image processing means.

18. An image forming apparatus, comprising:

image processing means for performing predetermined signal processing based on image data input from the image reading device recited in claim 12; and an image forming means for forming a visible image based on the image signals processed by said image processing means.

19. An image forming apparatus, comprising:

image processing means for performing predetermined signal processing based on image data input from the image reading device recited in claim 15; and an image forming means for forming a visible image based on the image signals processed by said image processing means.

20. An image forming apparatus, comprising:

image processing means for performing predetermined signal processing based on image data input from the image reading device recited in claim 16; and an image forming means for forming a visible image based on the image signals processed by said image processing means.

21. An image reading method, comprising steps of:

reading images of a first original document and a second original document conveyed on a platen at a fixed speed by an exposure optical system; and performing a shading operation by reading a shading plate for correcting a white level of the read image information before and after reading the image of the first original document, and to not perform a further shading operation before reading the image of the second original document.

22. An image reading method, comprising steps of:

reading an image of an original document conveyed on a platen at a fixed speed by an exposure optical system; and performing a shading operation by reading a shading plate for correcting a white level of the read image information immediately after an image of a next original document is read without performing the shading operation before reading the image of the next original document when the shading operation is performed after an image of the original document is read.

23. The image reading method according to claim 22, further comprising steps of:

performing the shading operation before reading the image of the next original document when an exposure lamp is turned off before reading the image of the next original document.

24. The image reading method according to claim 22, further comprising steps of:

performing the shading operation before reading the image of the next original document when a predetermined time has passed after the image of the original document is read.

25. An image reading method, comprising steps of:

reading an image of an original document conveyed on a platen at a fixed speed by an exposure optical system;

performing a first shading operation by reading a shading plate for correcting a white level of the read image information;

setting a switched image quality mode when an image quality mode set for reading an image of a preceding original document is switched before an image of a next one of a plurality of original documents is read; and performing a second shading operation.

26. An image reading method, comprising steps of:

reading an image of an original document conveyed on a platen at a fixed speed by an exposure optical system;

performing a first shading operation by reading a shading plate for correcting a white level of the read image information;

setting a switched background removal mode when a background removal mode set for reading an image of a preceding original document is switched before an image of a next one of a plurality of original documents is read; and performing a second shading operation.

27. An image forming method, comprising steps of:

performing predetermined signal processing based on image data obtained via the image reading method according to claim 21; and forming a visible image based on the image signal processed by said signal processing.

28. An image forming method, comprising steps of:

performing predetermined signal processing based on image data obtained via the image reading method according to claim 22; and forming a visible image based on the image signal processed by said signal processing.

29. An image forming method, comprising steps of:

performing predetermined signal processing based on image data obtained via the image reading method according to claim 25; and forming a visible image based on the image signal processed by said signal processing.

30. An image forming method, comprising steps of:

performing predetermined signal processing based on image data obtained via the image reading method recited according to claim 26; and forming a visible image based on the image signal processed by said signal processing.

* * * * *